United States Patent
Kovach

(10) Patent No.: US 9,504,197 B2
(45) Date of Patent: Nov. 29, 2016

(54) DISC BLADE CLAMPING DEVICE

(71) Applicant: CNH Industrial America LLC, New Holland, PA (US)

(72) Inventor: Michael G. Kovach, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 77 days.

(21) Appl. No.: 14/472,567

(22) Filed: Aug. 29, 2014

(65) Prior Publication Data

US 2015/0060096 A1    Mar. 5, 2015

Related U.S. Application Data

(60) Provisional application No. 61/873,189, filed on Sep. 3, 2013.

(51) Int. Cl.
*A01B 35/28*    (2006.01)

(52) U.S. Cl.
CPC ..................... *A01B 35/28* (2013.01)

(58) Field of Classification Search
CPC ....... A01B 35/28; A01B 35/22; A01B 39/22
USPC ......................................................... 172/763
See application file for complete search history.

(56) References Cited

U.S. PATENT DOCUMENTS

| | | | | |
|---|---|---|---|---|
| 2,211,675 A | * | 8/1940 | Rushbrook | A01B 23/06 172/252 |
| 2,730,031 A | * | 1/1956 | Buhr | A01B 35/22 172/307 |
| 3,191,691 A | | 6/1965 | Newkirk | |
| 3,380,786 A | | 4/1968 | Petersen | |
| 3,425,755 A | | 2/1969 | Harris | |
| 3,700,039 A | * | 10/1972 | Essex | A01B 61/046 172/265 |
| 3,827,505 A | | 8/1974 | Sosalla | |
| 4,050,524 A | * | 9/1977 | Hake | A01B 23/02 172/643 |
| 4,177,865 A | * | 12/1979 | Lewison | A01B 35/24 172/705 |
| 4,194,576 A | | 3/1980 | Graber | |
| 4,286,892 A | | 9/1981 | Wedman | |
| 4,318,524 A | * | 3/1982 | Degelman | A01B 23/02 172/264 |
| 4,461,358 A | * | 7/1984 | Lewison | A01B 61/046 172/705 |
| 4,465,396 A | | 8/1984 | Meinert et al. | |
| 4,483,401 A | | 11/1984 | Robertson | |
| 4,842,077 A | | 6/1989 | Peterson, Jr. et al. | |
| 5,042,590 A | * | 8/1991 | Bierl | A01B 21/08 172/572 |
| 5,080,178 A | * | 1/1992 | Dietrich, Sr. | A01B 21/086 172/153 |
| 5,195,597 A | | 3/1993 | Yeomans | |
| 5,267,619 A | | 12/1993 | Eversole | |
| 6,102,132 A | | 8/2000 | Schimke | |
| 6,602,020 B1 | | 8/2003 | Hansen | |
| 6,659,193 B1 | | 12/2003 | Best et al. | |
| 7,628,218 B2 | * | 12/2009 | Cresswell | A01C 5/06 172/566 |
| 2013/0062380 A1 | | 3/2013 | Maenle et al. | |

FOREIGN PATENT DOCUMENTS

EP    0 195 852 A2    12/1985
GB    2 050 131 A    1/1981

* cited by examiner

*Primary Examiner* — Thomas B Will
*Assistant Examiner* — Joel F. Mitchell
(74) *Attorney, Agent, or Firm* — Rebecca L. Henkel

(57) ABSTRACT

An agricultural tillage implement, including: a frame tube; and a disc blade hanger mounting assembly. The disc blade hanger mounting assembly includes: a disc blade hanger; at least one L-shaped bolt; and an L-shaped clamp, the L-shaped clamp being connected to the at least one L-shaped bolt and clamping the frame tube and the disc blade hanger together by way of the at least one L-shaped bolt.

9 Claims, 5 Drawing Sheets

DISC BLADE CLAMPING DEVICE

CROSS REFERENCE TO RELATED APPLICATIONS

This is a non-provisional application based upon U.S. provisional patent application Ser. No. 61/873,189, entitled "DISC BLADE CLAMPING DEVICE", filed Sep. 3, 2013, which is incorporated herein by reference.

BACKGROUND OF THE INVENTION

1. Field of the Invention

The present invention relates to agricultural implements, and, more particularly, to mounting assemblies for disc blade hangers of agricultural tillage implements.

2. Description of the Related Art

Farmers utilize a wide variety of tillage implements to prepare soil for planting. Some such implements include two or more sections coupled together to perform multiple functions as they are pulled through fields by a tractor. For example, a cultivator/harrow is capable of simultaneously tilling soil and leveling the tilled soil in preparation for planting. This implement includes a cultivator that is towed by a tractor, and a harrow that is towed by the cultivator. One type of tillage implement can include a frame tube supporting a gang of disc blades.

Units are known to use top and bottom plates or castings with long bolts to secure the disc blades to the frame. Long bolts tend to stretch and loosen in the field. Moreover, plates flex or bend and hardware will loosen. Eventually, disc blades become loose and move on the frame, or hardware will fatigue and fail. An arrangement is thus known which uses the top and bottom (flat) plates and long attaching hardware.

What is needed in the art is a mounting mechanism for connecting a frame tube to a disc blade hanger such that the mounting mechanism withstands rigorous application.

SUMMARY OF THE INVENTION

The present invention provides a disc blade hanger mounting assembly that uses an L-shaped clamp and L-shaped bolts to clamp the frame tube to a disc blade hanger.

The invention in one form is directed to an agricultural tillage implement, including: a frame tube; and a disc blade hanger mounting assembly. The disc blade hanger mounting assembly includes: a disc blade hanger; at least one L-shaped bolt; and an L-shaped clamp, the L-shaped clamp being connected to the at least one L-shaped bolt and clamping the frame tube and the disc blade hanger together by way of the at least one L-shaped bolt.

The invention in another form is directed to a disc blade hanger mounting assembly for mounting a disc blade hanger to a frame tube of an agricultural tillage implement. The disc blade hanger mounting assembly includes: at least one L-shaped bolt; an L-shaped clamp, the L-shaped clamp being connected to the at least one L-shaped bolt and configured for clamping the frame tube and the disc blade hanger together by way of the at least one L-shaped bolt.

The invention in yet another form is directed to a disc blade hanger mounting assembly for mounting a disc blade hanger to a frame tube of an agricultural tillage implement. The mounting assembly includes: an L-shaped clamp configured for being connected to at least one L-shaped bolt and for clamping the frame tube and the disc blade hanger together by way of the at least one L-shaped bolt.

An advantage of the present invention is that it provides a mounting assembly which clamps the frame tube to the disc blade hanger.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention, and such exemplifications are not to be construed as limiting the scope of the invention in any manner.

DETAILED DESCRIPTION OF THE INVENTION

Figure 1:
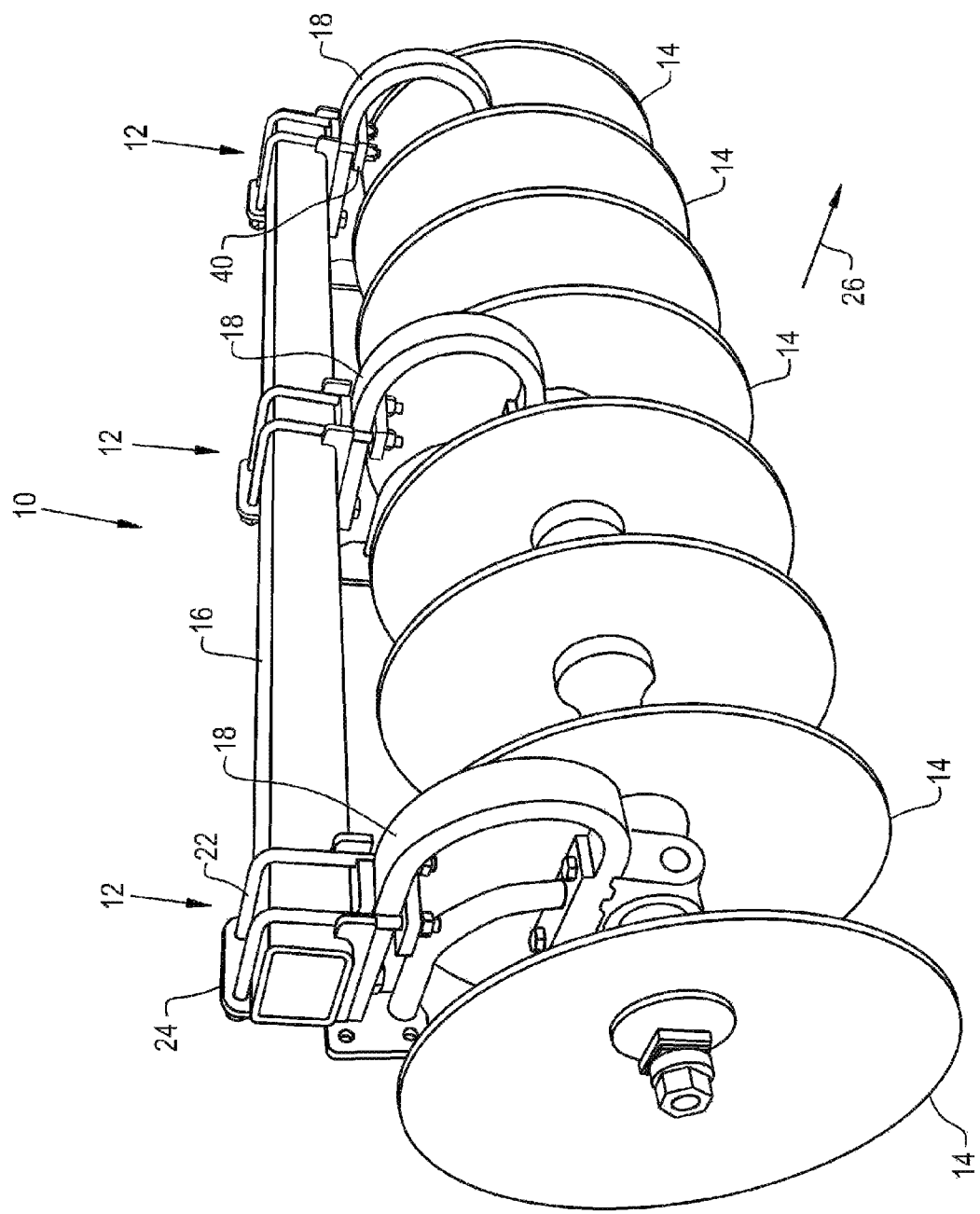
FIG. 1 is a perspective view of a part of an agricultural tillage implement according to the present invention.
Figure 2:
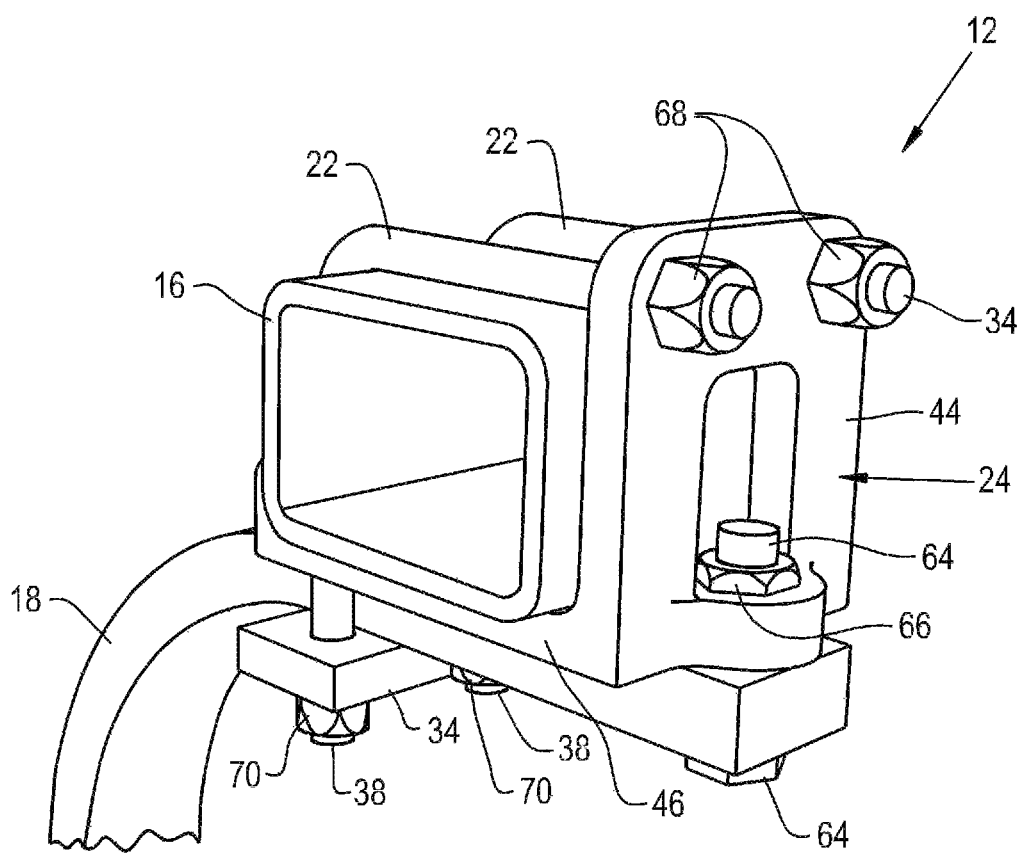
FIG. 2 is a perspective view of the disc blade hanger mounting assembly of FIG. 1, with portions broken away.

Referring now to the drawings, and more particularly to FIG. 1, there is shown part of an agricultural tillage implement 10 including a frame tube 16 and a disc blade hanger mounting assembly 12. Agricultural tillage implement 10 is, for example, a field disk ripper (not fully shown); it is understood, however, that disc blade hanger mounting assembly 12 of the present invention can be used with other types of agricultural tillage implements. The agricultural tillage implement can include a plurality of gangs of disc blades 14, one such gang of disc blades 14 being shown in FIG. 1. While not fully shown, agricultural tillage implement 10 can be viewed schematically as a square with a plurality of sub-sections therein, one of these sub-sections being shown in FIG. 1; one or more other sub-sections can include what is shown in FIG. 1 or other components.

Figure 3:
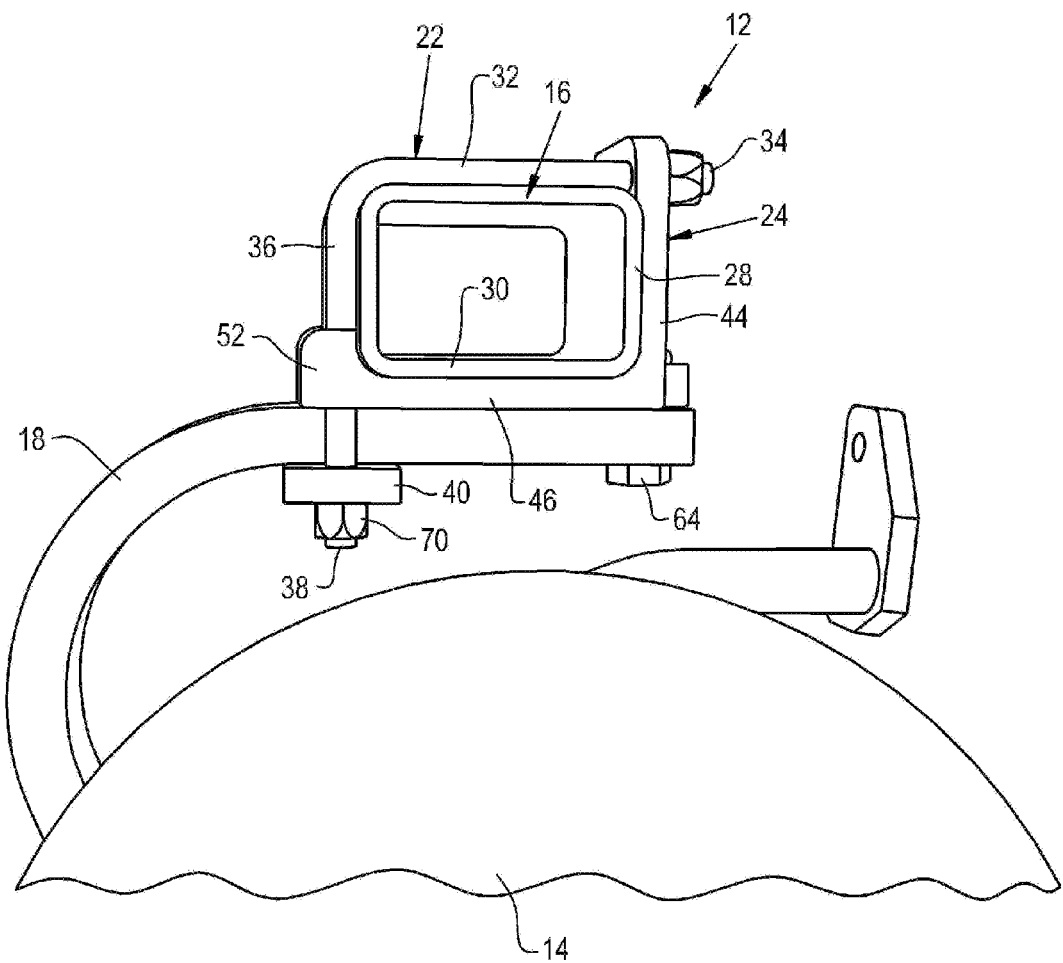
FIG. 3 is a side perspective view of the disc blade hanger mounting assembly of FIG. 1, with portions broken away.
Figure 4:
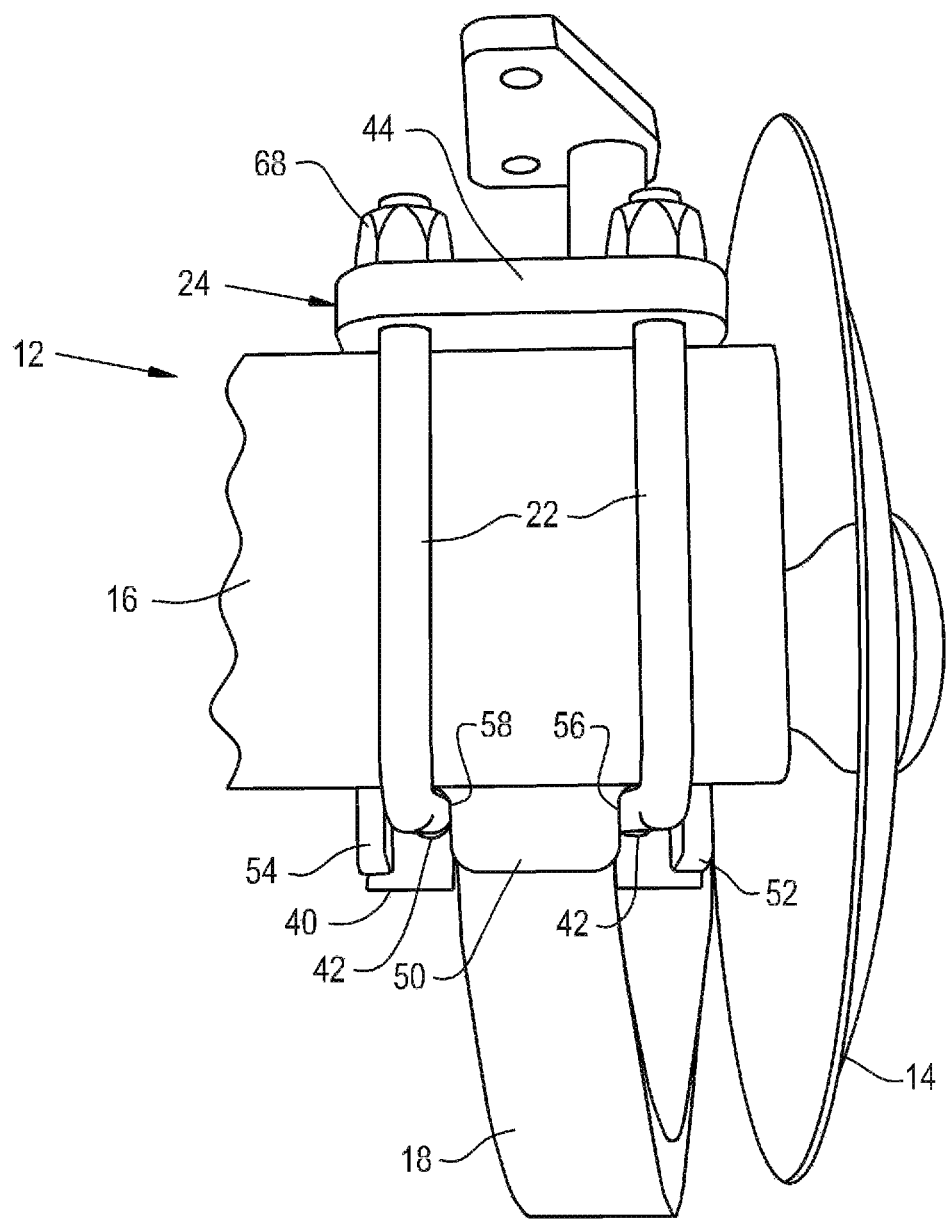
FIG. 4 is a top perspective view of the disc blade hanger mounting assembly of FIG. 1, with portions broken away.

Frame tube 16 is part of agricultural tillage implement 10 and extends generally transverse to the direction of travel 26 of agricultural tillage implement 10 across the ground. Frame tube 16 can have, for example, a square or rectangular cross-section. FIG. 3 shows that frame tube 16 includes a rear side 28 and a bottom side 30 (the term "rear" being determined by the direction of travel 26 of agricultural tillage implement 10 across the ground, the direction of travel 26 across the ground being determined by the direction that the tractor pulls agricultural tillage implement 10). Frame tube 16 can be made of steel, for example.

FIG. 1 shows a plurality of disc blade hanger mounting assemblies 12 mounted to frame tube 16, and FIGS. 1-4 show disc blade hanger mounting assembly 12 from various angles. According to one embodiment of the present invention, disc blade hanger mounting assembly 12 includes a disc blade hanger 18, at least one L-shaped bolt 22, and an L-shaped clamp 24, L-shaped clamp 24 being connected to at least one L-shaped bolt 22 and clamping frame tube 16 and disc blade hanger 18 together by way of at least one L-shaped bolt 22. According to another embodiment of the present invention, disc blade hanger mounting assembly 12 includes at least one L-shaped bolt 22 and L-shaped clamp 24, L-shaped clamp 24 being connected to at least one L-shaped bolt 22 and being configured for clamping frame tube 16 and disc blade hanger 18 together by way of at least one L-shaped bolt 22. In yet another embodiment of the present invention, disc blade hanger mounting assembly 12 includes L-shaped clamp 24 which is configured for being connected to at least one L-shaped bolt 22 and for clamping frame tube 16 and disc blade hanger together by way of at least one L-shaped bolt 22. Disc blade hanger mounting assembly 12 is thus for mounting disc blade hanger 18 of disc blade hanger mounting assembly 12 to frame tube 16 of agricultural tillage implement 10.

Disc blade hanger 18 includes a proximal end and a distal end. At the proximal end of disc blade hanger 18, disc blade hanger 18 is attached to frame tube 16 by way of L-shaped bolts 22 and L-shaped clamp 24. At the distal end of disc blade hanger 18, disc blade hanger 18 is attached to at least one disc blade 14 which travels (such as by rotating) across the ground and tills the soil. Disc blade hanger 18 can be made of steel, for example.

Bolt 22 is L-shaped. Each disc blade hanger mounting assembly 12 can include two bolts 22 (in this way, the at least one L-shaped bolt 22 includes two L-shaped bolts 22), two bolts 22 being a first L-shaped bolt 22 and a second L-shaped bolt 22. Each L-shaped bolt 22 is connected to L-shaped clamp 24, attaches L-shaped clamp 24 to frame tube 16, and clamps disc blade hanger 18 to at least one end of L-shaped clamp 24. Each L-shaped bolt 22 includes a first leg 32 with a first end 34 and a second leg 36 with a second end 38. Each bolt 22 can be made of steel, for example.

Disc blade hanger mounting assembly 12 further includes a support plate 40. Support plate 40 can be a rectangular plate 40 with two through-holes 42. Support plate 40 can be made of steel, for example. Support plate 40 and L-shaped clamp 24 are configured for clamping disc blade hanger 18 therebetween.

Figure 5:
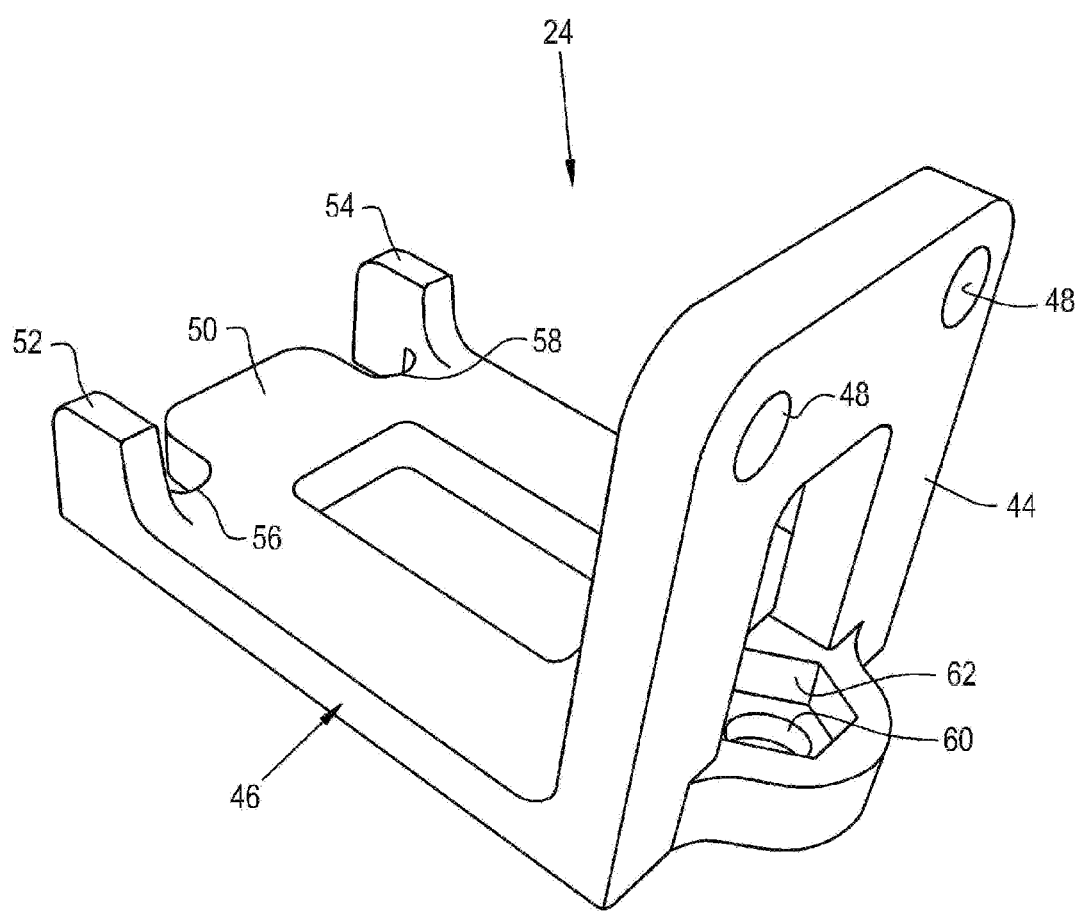
FIG. 5 is a perspective view of the L-shaped clamp of FIG. 1 according to the present invention.

L-shaped clamp 24 is connected to at least one L-shaped bolt 22 and is configured for clamping and does clamp frame tube 16 and disc blade hanger 18 together by way of at least one L-shaped bolt 22. In light of two L-shaped bolts 22, L-shaped clamp 24 is connected to each L-shaped bolt 22 and is configured for clamping and does clamp frame tube 16 and disc blade hanger 18 together by way of each L-shaped bolt 22. As shown in FIG. 5, L-shaped clamp 24 includes a first wall 44 and a second wall 46 which is substantially perpendicular to first wall 44. L-shaped clamp 24 can be made of steel, for example, and can be made by a casting operation. L-shaped clamp 24 can thus be a casting 24 and be referred to as a casting 24. In this way, L-shaped clamp 24 can be one monolithic piece. First wall 44 of L-shaped clamp 24 includes two through-holes 48 each of which is configured for receiving therethrough a respective first end 34 of a first leg 32 of a respective L-shaped bolt 22. Second wall 46 of L-shaped clamp 24 includes a body 50, a first upstanding tab 52, and a second upstanding tab 54. Body 50 and first upstanding tab 52 form a first recess 56 which is configured for having a second leg 36 of a first L-shaped bolt 22 positioned therein. Body 50 and second upstanding tab 54 form a second recess 58 which is configured for having a second leg 36 of a second L-shaped bolt 22 positioned therein. Second wall 46 of L-shaped clamp 24 further includes a through-hole 60 in communication with a recess 62.

L-shaped clamp 24 is used to clamp frame tube 16 to disc blade hanger 18. FIG. 1 shows that a plurality of disc blade hangers 18 can be clamped to frame tube 16 using a plurality of L-shaped clamps 24. L-shaped clamp 24 is mounted to disc blade hanger 18 and is bolted to disc blade hanger 18 by way of a bolt 64 being inserted up through a corresponding hole in disc blade hanger 18 and through through-hole 60 in second wall 46 of L-shaped clamp 24. A nut 66 is threadably received on the end of bolt 64 and is thus positioned in recess 62 after tightening nut 66 onto bolt 64 so as to clamp one end of second wall 46 to disc blade hanger 18. Frame tube 16 is positioned in the opening formed by first wall 44 and second wall 46 of L-shaped clamp 24; L-shaped clamp 24 is configured for being, and is, open toward direction of travel 26. In this way, first wall 44 of L-shaped clamp 24 is configured for being positioned, and is positioned, adjacent rear side 28 of frame tube 16, and second wall 46 of L-shaped clamp 24 is configured for being positioned, and is positioned, adjacent bottom side 30 of frame tube 16. In this way, L-shaped clamp 24 contacts frame tube 16 on the rear and bottom sides 28, 30 of frame tube 16. Further, (a) first upstanding tab 52 and second upstanding tab 54 and (b) first wall 44 are configured for having positioned therebetween frame tube 16; thus, frame tube 16 is positioned between (a) first upstanding tab 52 and second upstanding tab 54, and (b) first wall 44, as shown in FIG. 3.

Frame tube 16 and disc blade hanger 18 are clamped together using L-shaped clamp 24, L-shaped bolts 22, and support plate 40. Each through-hole 48 of first wall 44 receives therethrough a respective first end 34 of a respective L-shaped bolt 22. Thus, a first end 34 of one bolt 22 is inserted through one through-hole 48 of first wall 44 of L-shaped clamp 24. A first end 34 of the other bolt 22 is inserted through the other through-hole 48 of first wall 44 of L-shaped clamp 24. A nut 68 is threaded onto first end 34 of each bolt 22, first wall 44 being positioned adjacent each nut 68. In this way, the first end 34 of each L-shaped bolt 22 is connected to L-shaped clamp 24. Second leg 36 of first L-shaped bolt 22 is positioned in first recess 56. Second leg 36 of second L-shaped bolt 22 is positioned in second recess 58. Second leg 36 of first bolt 22 and second leg 36 of second bolt 22 are configured for having positioned therebetween disc blade hanger 18; thus, disc blade hanger 18 is positioned between second leg 36 of first bolt 22 and second leg 36 of second bolt 22.

Support plate 40 is positioned below disc blade hanger 18 near L-shaped clamp 24. Support plate 40 is connected to each L-shaped bolt 22. That is, second end 38 of each L-shaped bolt 22 is connected to support plate 40 in that second end 38 of second leg 36 of each L-shaped bolt 22 is inserted in a respective through-hole 42 of support plate 40. A nut 70 is threaded onto each second end 38 so as to tighten support plate 40 against disc blade hanger 18 and thereby to tighten frame tube 16 onto L-shaped clamp 24 and thereby to clamp frame tube 16 to disc blade hanger 18. In this way, support plate 40 and L-shaped clamp 24 clamp disc blade hanger 18 therebetween.

In use, disc blade hanger 18, which is attached to at least one disc blade 14, is clamped to frame tube 16. Disc blade hangers 18 can be easily attached to or detached from frame tube 16 by way of the various fasteners described herein. The arrangement described herein securely clamps disc blade hanger 18 to frame tube 16.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
   a frame tube; and
   a disc blade hanger mounting assembly attached to the frame tube, the disc blade hanger mounting assembly including:
      an L-shaped clamp including a first wall and a second wall which is substantially perpendicular to said first wall; said first wall including two through-holes; said second wall including a body, a first upstanding tab, and a second upstanding tab; said body and said first upstanding tab forming a first recess; said body and said second upstanding tab forming a second recess;
      a support plate with two through-holes;
      a first L-shaped bolt and a second L-shaped bolt, each of said first L-shaped bolt and said second L-shaped bolt including a first leg with a first end and a second leg with a second end; said first end of each of said first L-shaped bolt and said second L-shaped bolt being coupled to said L-shaped clamp through one of the said first wall two through-holes; said second leg of each of said first L-shaped bolt and said second L-shaped bolt being positioned in one of said first recess and said second recess and through one of said support plate two through-holes;
      a plurality of fasteners; and
   a disc blade hanger coupled to the L-shaped clamp, said disc blade hanger being positioned between said support plate and said second wall, said disc blade hanger being positioned between said second leg of said first L-shaped bolt and said second leg of said second L-shaped bolt; each of said first end and said second end of said first L-shaped bolt and said second L-shaped bolt secured with one of said plurality of fasteners.

2. The agricultural tillage implement of claim 1, wherein said frame tube includes a rear side and a bottom side, said first wall of said L-shaped clamp being positioned adjacent said rear side of said frame tube, said second wall of said L-shaped clamp being positioned adjacent said bottom side of said frame tube, said L-shaped clamp being open toward a direction of travel; said frame tube being positioned between (a) said first upstanding tab and said second upstanding tab, and (b) said first wall.

3. The agricultural tillage implement of claim 1, wherein said L-shaped clamp is a casting.

4. The agricultural tillage implement of claim 1, wherein said second wall of said L-shaped clamp includes a through-hole, said disc blade hanger includes a through-hole, said disc blade hanger further coupled to said L-shaped clamp by a bolt passing through the through hole of the disc blade hanger and the through-hole of said second wall of said L-shaped clamp and secured by a fastener.

5. A disc blade hanger mounting assembly for mounting a disc blade hanger to a frame tube of an agricultural tillage implement, said disc blade hanger mounting assembly comprising:
   an L-shaped clamp including a first wall and a second wall which is substantially perpendicular to said first wall; said first wall including two through-holes; said second wall including a body, a first upstanding tab, and a second upstanding tab; said body and said first upstanding tab forming a first recess; said body and said second upstanding tab forming a second recess;
   a support plate with two through-holes;
   a first L-shaped bolt and a second L-shaped bolt, each of said first L-shaped bolt and said second L-shaped bolt including a first leg with a first end and a second leg with a second end; said first end of each of said first L-shaped bolt and said second L-shaped bolt being coupled to said L-shaped clamp through one of the said first wall two through-holes; said second leg of each of said first L-shaped bolt and said second L-shaped bolt being positioned in one of said first recess and said second recess and through one of said support plate two through-holes;
   a plurality of fasteners; and
   a disc blade hanger coupled to the L-shaped clamp, said disc blade hanger being positioned between said support plate and said second wall, said disc blade hanger being positioned between said second leg of said first L-shaped bolt and said second leg of said second L-shaped bolt; each of said first end and said second end of said first L-shaped bolt and said second L-shaped bolt secured with one of said plurality of fasteners.

6. The disc blade hanger mounting assembly of claim 5, wherein said L-shaped plate is a casting.

7. The disc blade hanger mounting assembly of claim 5, wherein said second wall of said L-shaped clamp includes a through-hole, said disc blade hanger includes a through-hole, said disc blade hanger further coupled to said L-shaped clamp by a bolt passing through the through hole of the disc blade hanger and the through-hole of said second wall of said L-shaped clamp and secured by a fastener.

8. A method of attaching a disc blade hanger to a frame tube of an agricultural tillage implement, the method comprising:
   providing a disc blade hanger mounting assembly including:
      an L-shaped clamp including a first wall and a second wall which is substantially perpendicular to said first wall; said first wall including two through-holes; said second wall including a body, a first upstanding tab, and a second upstanding tab; said body and said first upstanding tab forming a first recess; said body and said second upstanding tab forming a second recess;
      a support plate with two through-holes;
      a first L-shaped bolt and a second L-shaped bolt, each of said first L-shaped bolt and said second L-shaped bolt including a first leg with a first end and a second leg with a second end; and
      a plurality of fasteners;
   positioning said disc blade hanger mounting assembly on said frame tube, said frame tube including a rear side and a bottom side, said first wall of said L-shaped clamp being positioned adjacent said rear side of said frame tube, said second wall of said L-shaped clamp being positioned adjacent said bottom side of said frame tube, said L-shaped clamp being open toward a direction of travel, said frame tube being positioned between (a) said first upstanding tab and said second upstanding tab, and (b) said first wall;

positioning said first end of each of said first L-shaped bolt and said second L-shaped bolt through the respective said two through-holes of the first wall of said L-shaped clamp; positioning said second leg of each of said first and second L-shaped bolts in respective said first and second recesses of said L-shaped clamp and through said respective support plate two through-holes;

positioning said disc blade hanger (a) between said support plate and said second wall, and (b) between said second leg of said first L-shaped bolt and said second leg of said second L-shaped bolt; and securing each of said first end and said second end of said first L-shaped bolt and said second L-shaped bolt with one of said plurality of fasteners.

9. The method of claim 8, wherein said first wall of said L-shaped clamp includes a third through-hole perpendicular to said two through-holes, said disc blade hanger includes a through-hole, said disc blade hanger further coupled to said L-shaped clamp by a bolt passing through the through hole of the disc blade hanger and the third through-hole of said L-shaped clamp and secured by a fastener.

\* \* \* \* \*